350-3.73 SR

OR 3,614,192

United States Patent

[11] 3,614,192

[72] Inventor Kendall Preston, Jr.
New Haven, Conn.

[21] Appl. No. 888,110
[22] Filed Dec. 18, 1969
[23] Division of Ser. No. 736,505, June 12, 1968, Pat. No. 3,553,460
[45] Patented Oct. 19, 1971
[73] Assignee The Perkin-Elmer Corporation
Norwalk, Conn.

[54] HOLOGRAPHIC LOGIC OPERATOR FOR AN OPTICAL DATA PROCESSING SYSTEM

3 Claims, 23 Drawing Figs.

[52] U.S. Cl. .......... 350/3.5, 250/216
[51] Int. Cl. .......... G02b 27/00
[50] Field of Search .......... 350/3.5; 250/216

[56] References Cited

UNITED STATES PATENTS 3,405,614 10/1968 Lin et al. .......... 350/3.5

OTHER REFERENCES

Stroke et al., Proceeding of the IEEE, Vol. 55, Jan. 1967, pp. 109–111 (copy in 350/3.5)

*Primary Examiner*—David Schonberg
*Assistant Examiner*—Ronald J. Stern
*Attorney*—Edward R. Hyde, Jr.

ABSTRACT: A method of processing information by combining regions of a radiant energy beam which have been modulated according to the information. The combination is performed according to a pattern of phase relationships which produces the desired function of the information. A preferred apparatus for performing this method includes a source of coherent radiation, means for phase modulating regions of the beam and a holographic processing element which corresponds to an array of points having the selected pattern of phase relationships. The output may be determined by a second modulating means associated with a subsequent processing stage or by a readout means.

Figures 1, 2A, 2B, 2C:
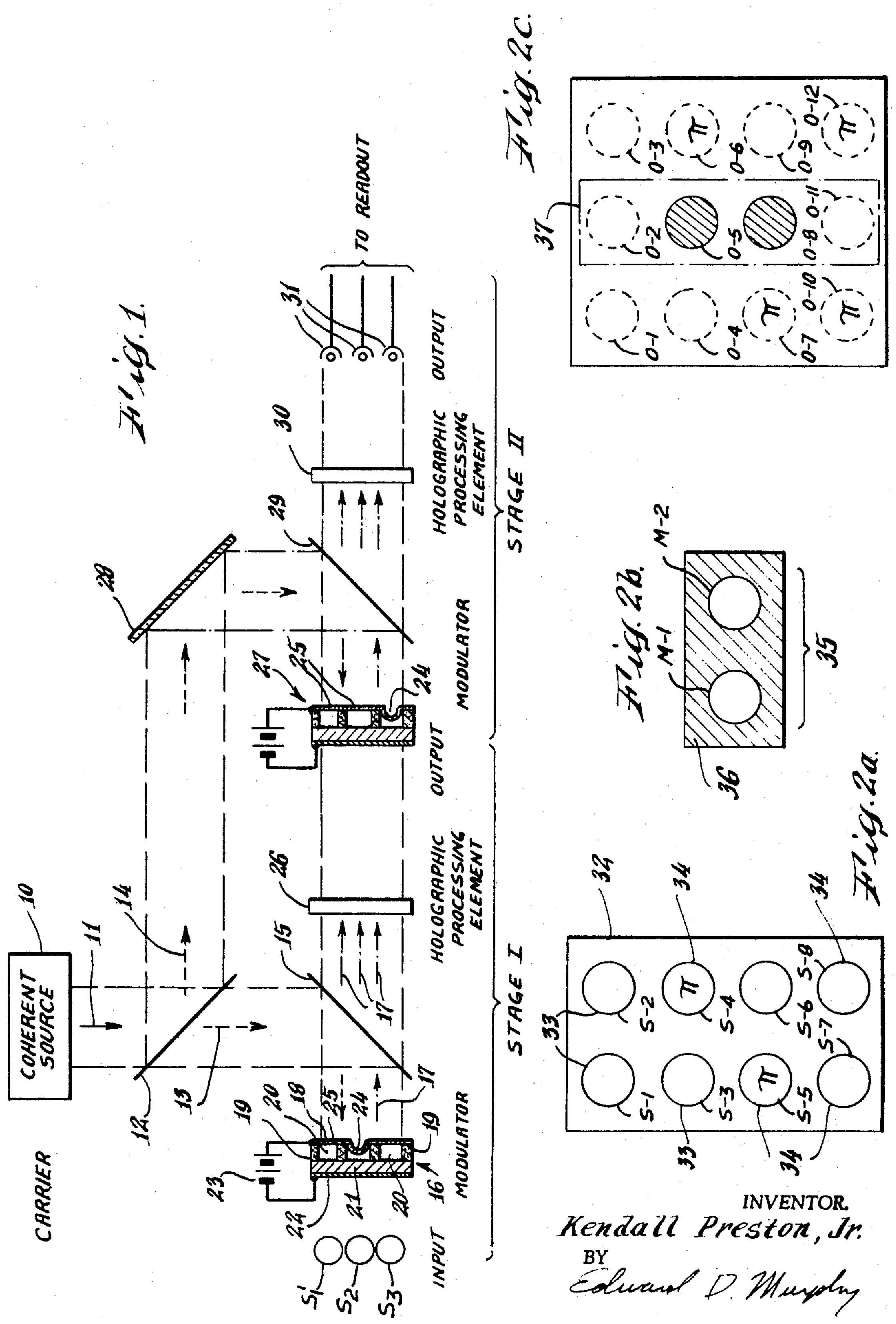

INVENTOR.
Kendall Preston, Jr.
BY
Edward D. Murphy
ATTORNEY

INVENTOR.
Kendall Preston, Jr.
BY Edward D. Murphy
ATTORNEY.

INVENTOR.
Kendall Preston, Jr.
BY Edward D. Murphy
ATTORNEY.

INVENTOR.
Kendall Preston, Jr.
BY Edward D. Murphy
ATTORNEY.

INVENTOR.
Kendall Preston, Jr.
BY Edward D. Murphy
ATTORNEY.

HOLOGRAPHIC LOGIC OPERATOR FOR AN OPTICAL DATA PROCESSING SYSTEM

This application is a division of application Ser. No. 736,505 filed June 12, 1968 add after 1968, now U.S. Pat. No. 3,553,460.

This invention is directed to high-speed digital data processing and particularly relates to a system which uses radiant energy to process information.

Present data processing systems necessarily operate on input information in a one-dimensional manner. This is due to the fact that electrical signals are functions of time only and cannot be separated by any other basic parameter. Some systems do achieve a form of operation known as parallel processing; however, this is done by simultaneously performing different lines of series operations. Accordingly, this manner of operation requires that one line of equipment be provided for each line of information processed, and this involves repeating each of the elements of the line. Thus, the number of components and the required expense are substantially increased. Even then it is not possible to process different data items simultaneously in a single line with present equipment. Thus, two-dimensional processing, either in the sense of simultaneously processing different information through a single-processing circuit or in the sense of operating in two distinct dimensions such as space and time on a single set of data would enable a substantial saving in the number of components required to achieve a given speed of processing, and would greatly increase the speed and capacity of a maximized system.

Accordingly, it is an object of this invention to provide a novel method of data processing.

Another object of this invention is the provision of a new and improved data processing apparatus.

A further object of this invention is the provision of a new and improved method of data processing, and of apparatus therefor, which is capable of simultaneous processing of many distinct sets of information.

It is also an object of this invention to provide a new and improved data processing method and apparatus which enable two-dimensional processing of information.

Another object of this invention is the provision of new and improved processing elements which enable high speed simultaneous and two-dimensional data processing to be achieved.

To accomplish these and other objects of this invention, one embodiment of this invention is directed to a method of data processing which includes the steps of providing a beam of substantially coherent radiation, modulating regions of the beam in accord with information to be processed, and combining sets of the regions according to a pattern of phase relationships which produce an output including information corresponding to selected functions of the input information. In a specific embodiment, the combining is performed holographically by applying the modulated beam to a hologram of an array of points which adds each set of corresponding input regions according to the relative phases of the points in the array.

Another aspect of this invention is directed to a preferred apparatus for performing this method. Specifically, I provide a data processing system including a plurality of processing units arranged to perform a series of logical operations. Each processing unit includes a source of coherent radiation for providing a beam, means for modulating regions of the beam in accord with input information, a holographic processing element for producing an output beam including functions of the input information and means for determining the output information. In a specific embodiment, the holographic processing element corresponds to an array of spatially distinct points having selected spatial and phase relationships.

Another aspect of this invention is the provision of specific holographic processing elements which perform binary digital operations. These comprise holographic transparencies corresponding to specific point arrays having particular phase relationships.

Figure 3C:
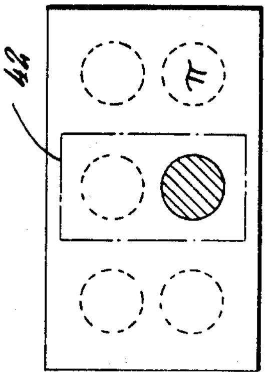
Figure 3B:
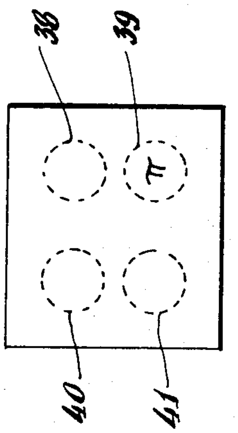
Figure 3A:
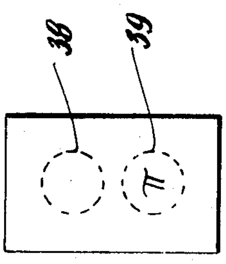
Figure 4:
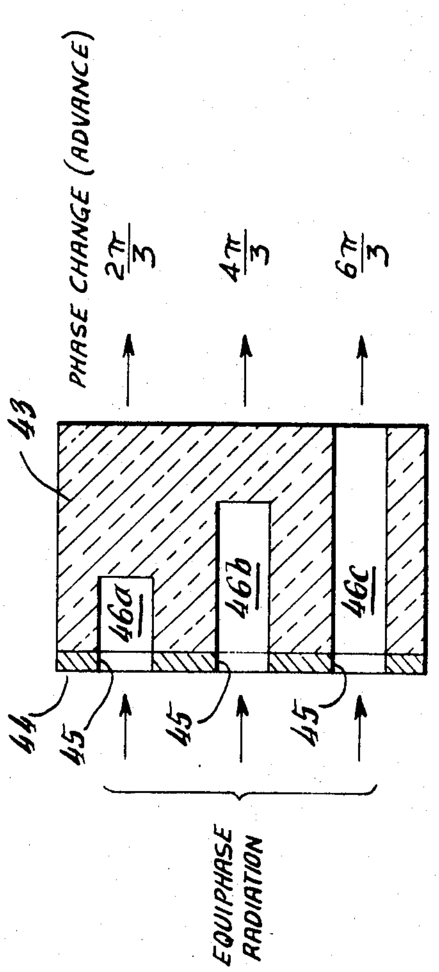

The novel features believed characteristic of the invention are set forth in the appended claims. The invention itself, together with further objects and advantages thereof may best be understood by reference to the following description taken in connection with the appended drawings in which:

FIG. 1 is a schematic illustration of the functional elements of apparatus in accord with this invention;

FIGS. 2*a*, 2*b* and 2*c* are schematic representations illustrating the performance of a particular logic function in accord with this invention;

FIGS. 3*a*, 3*b* and 3*c* are schematic representations illustrating the performance of another function;

FIG. 4 is a vertical cross section of a mask for making a hologram for use in this invention;

FIGS. 5*a*–5*g* are illustrations of the performance of another function; and

Figure 6B:
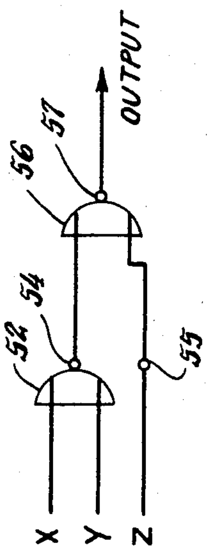
Figure 6C:
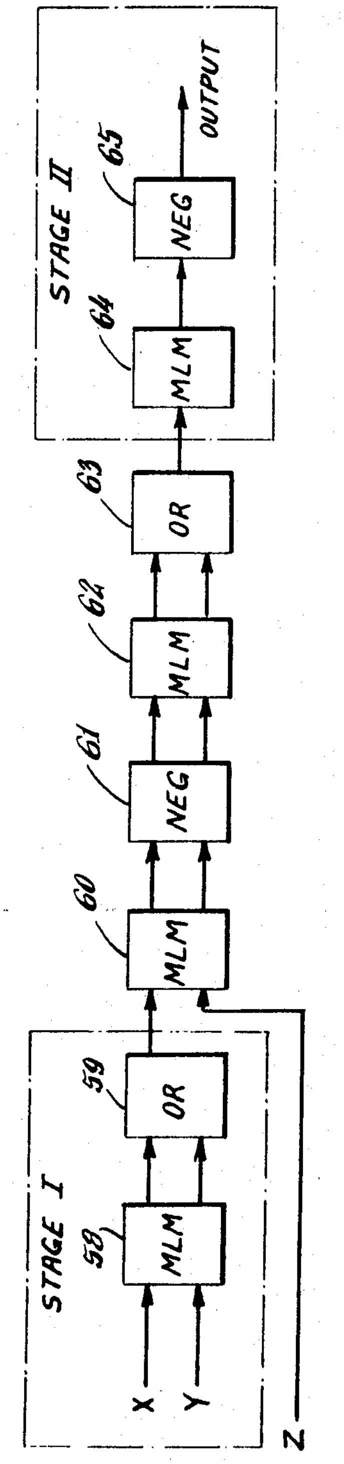
Figure 6A:
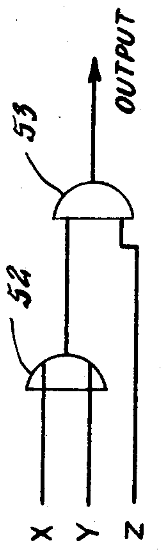
Figure 7B:
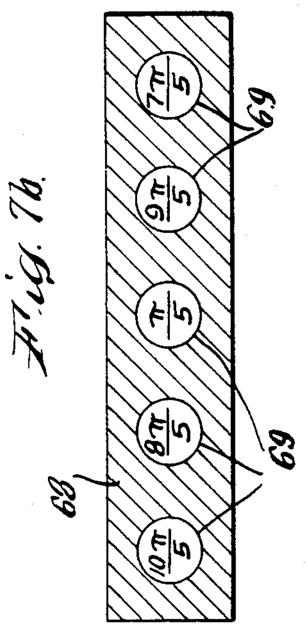
Figure 7D:
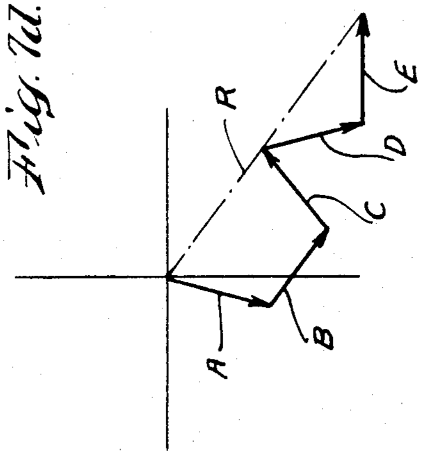
Figure 7E:
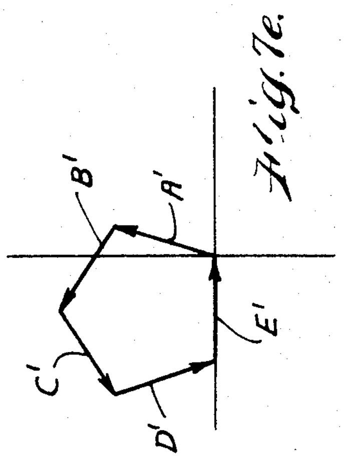
Figure 7C:
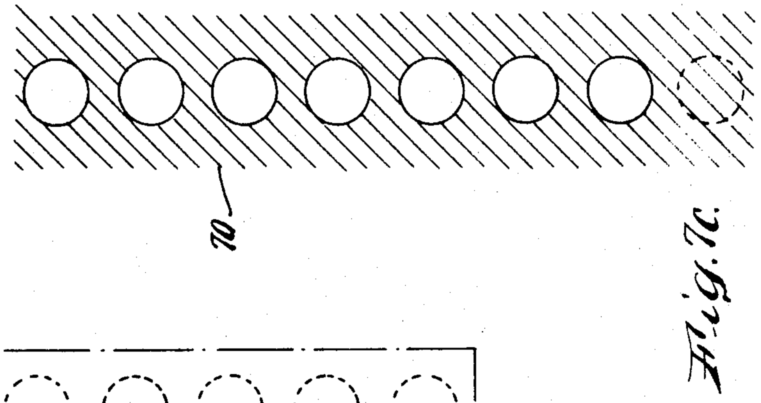
Figure 7A:
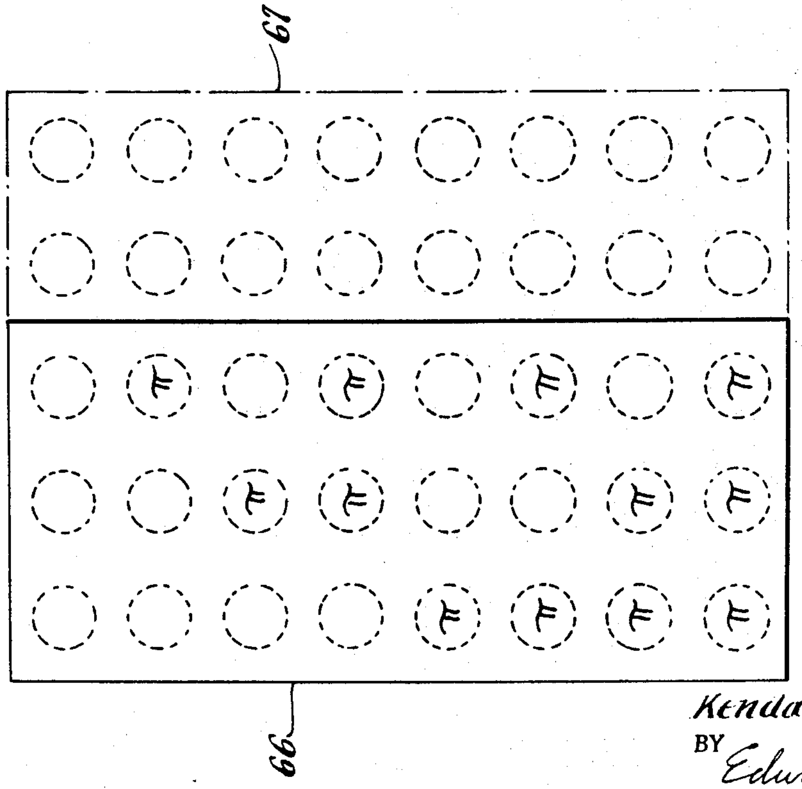

FIGS. 6*a*, 6*b* and 6*c* are schematic diagrams of a logical processing sequence; and FIGS. 7*a*, 7*b* and 7*c* illustrate the performance of another logic function in accord with this invention and FIGS. 7*d* and 7*e* are vector diagrams illustrating the logic function shown in FIGS. 7*a*, 7*b* and 7*c*.

A complete computing system includes such items as a memory for storing data and standard instructions, an addressing unit for introducing information, a control unit for carrying out a program, etc. In a system in accord with this invention, these elements may be the same as those normally used and they may be used in the conventional manner. Accordingly, these have not been included in this description. The present invention is directed to a novel method of processing and to a novel processing subsystem or unit. This subsystem may be connected to a conventional computer using such elements at its input and output or it may be used in a computer specifically designed to utilize the full potential of this invention.

To perform the functions required in a processing system in accord with the present invention, a substantially coherent source of radiant energy is used as a carrier on which the information to be processed is imposed. A modulator is provided to write the input information on the carrier spatially, i.e., in a manner that varies from point to point depending upon the input code. The input information may be derived from a memory, from a previous processing unit or from a direct input such as a keyboard. Preferably, this information is applied in binary digital form although other inputs may also be used. In accord with this invention, the carrier is a source of electromagnetic radiation and the write function is performed by some form of radiation modulation such as phase shifting.

To perform logical operations on the information carried by the beam, the modulated regions are combined according to a pattern of phase relationships. Preferably, this is done holographically and the processing element used comprises a holographic transparency of an array of points. This element modifies the input information to produce the desired function thereof. In binary logic processing, operators such as the OR operator or the NEGATE operator may be used since, by means of these operators, all propositional logic may be performed. For convenience, other operators may be provided if desired.

Finally, means are provided for determining the output produced by the processing element. This may be performed by direct readout to an appropriate display device or by applying the information to a carrier for further operation in the next processing circuit.

A data processing system based on the present invention includes many such processing units so that information can be processed through the many steps required for analysis. The fact that this processing is performed optically permits simultaneous application of many inputs to each of these systems with completely distinguishable results, thus accomplishing parallel processing. Two-dimensional processing may be achieved by applying multiple spatially separate input patterns so that the outputs overlap and various combinations of the inputs are simultaneously obtained.

An understanding of the manner in which combinations and reproductions of the input pattern are obtained requires a description of the nature of a holographic image. The hologram of an object is a recording on a transparency of the interference fringes produced between a coherent beam of light scattered from the object, and another coherent beam of the same wavelength, called the reference beam. Illumination of the hologram by a coherent beam of the same wavelength produces a three-dimensional image of the original object. In effect, the interference fringes recorded on the transparency act as lenses to focus the illuminating beam and form the image. Conventional applications of holography are generally based on this feature of reproduction.

The holographic processing step of this invention is not based on three-dimensional reproduction, but rather is based on the realization that the image produced from a hologram is actually made up of a large number of refocused points, each one of which is a reproduction of the source from which the hologram is illuminated. In the case of an object having continuous surfaces, these refocused points form an image of the surfaces. However, if the hologram is made from an array consisting of a plurality of distinguishable points, then illumination of that hologram produces an image of the illuminating source at each of a plurality of points corresponding to the original array. Finally, if the illumination itself comprises an array of distinct information-bearing regions, then the output image contains many reproductions of this array of information-bearing regions, one for each distinguishable point in the array from which the hologram was made. Depending on the relative distances between the points in the respective arrays, partial overlap of the various images of the illuminating source array can be produced. Since the radiation is coherent, constructive or destructive interference occurs at the points of overlap. The results of such interference produce the desired propositional logic operations. By properly locating detectors in the output plane, these results may be used in the next computer stage.

The holographic transparency used in a processing unit may be an actual hologram made by preparing a mask which defines the array and exposing a film to the corresponding pattern of interference fringes, or it may be prepared by other methods such as using a computer to predict the pattern of fringes which would be obtained by using a given mask. In the following description, the terms "mask" and "array" are intended to mean the mask and array which correspond to a particular pattern of fringes, regardless of whether or not a mask is actually prepared. It is also noted that the term "holographic transparency" refers to any spatial light modulator which, when illuminated by coherent light of the proper wavelength, produces a three-dimensional image of the corresponding array. Usually, this will be a pattern of opaque and clear regions in a film.

As a further basis for the processing operation of this invention, I have determined that phase information contained in a light source is conserved when it is reproduced by a hologram. That is, if a hologram is made of a point which has a given phase relation to a reference, then, when this hologram is illuminated by a source, the output is a single point which has the same phase relation to the illuminating source as the original point had to the reference. From this general statement, it follows that a hologram made of an array of points A, when illuminated by a source consisting of a single region, produces output points at an array of locations corresponding to the locations of the points in the original array A and these output points each have a phase relation to the source region which is the same as the phase relation to a reference of the point at the corresponding location in the original array. Furthermore, if the illuminating source is itself an array of regions B, then each region in B generates a reproduction of the original array A. The phase of each point within each of these reproductions relative to the region in source array B which generates it is the same as the phase relation to a reference of the point in original array A to which it corresponds.

Another property of holographic reproduction necessary to this invention is that the images of the original array generated by each of the source regions overlap if the source regions have the same spatial relation as the original array. In other words, the hologram of an array sums each set of points in the source which have the same spatial relation as the array from which the hologram is made. To make use of this property, a source is provided which comprises an area of constant phase illumination to serve as the reference, specific regions within the area are modulated according to input information, the modulated beam is applied to a hologram of an array having predetermined phase and spatial relations among its points, and outputs are determined at locations corresponding to various combinations of the modulated regions with each other and with the background reference.

The combined effect of these properties is as follows: the hologram produces a distinct output location for each set of regions in the input which have the same spatial relation as its holographic array. At this output location, one vector is present for each input region in the set. Each vector is changed in phase from its input value by the phase difference from a reference of its corresponding point in the holographic array. Finally, the output point value, which arises by means of interference, is the vector sum of these vectors.

These properties of phase relation and of spatial relation among the source, the mask from which the hologram is made, and the output form the basis for the data processing which is performed by the apparatus of this invention. It is noted that the properties are applicable to holographic reproduction performed either with collimated light or with focused light. For convenience, this description is based on the form using collimated light; the manner of using the focused beam will be clear to those skilled in the art.

FIG. 1 illustrates the preferred apparatus which uses these principles to implement the processing functions used in a computer. The first of these elements is the source 10 of the carrier beam of radiation indicated by the solid arrow 11. The source 10 may comprise a laser. In general, any source of substantially coherent radiation may be used. Even in a laser, absolute coherence is not usually obtained and oscillations over a range of adjacent wavelengths may occur. A beamsplitter 12 may also be used if a single source is used to provide beams 13 and 14 for carriers at different locations in the apparatus. For purposes of illustration, a two stage system is shown in FIG. 1 and the beamsplitter supplies a carrier for Stage I and Stage II.

To provide the input information on the carrier beam 13 of Stage I, means are provided for modulating the coherent output of the laser. In accord with the preferred embodiment, the modulation takes the form of phase changes superimposed on the carrier beam at different spatial locations in a binary digital manner. In the illustration, Stage I includes a beamsplitter 15 which directs the beam onto a modulator array 16 while permitting the beam reflected from the array, 17, to enter the processing region. The array 16 preferably comprises an array of membrane light modulating elements of the type described and claimed in my copending application, Ser. No. 588,384, filed Oct. 21, 1966 and assigned to the assignee of this invention. In a specific case, the array may comprise a conductive reflective membrane 18 supported on sets of insulating ridges 19 which extend horizontally and vertically to define enclosed wells 20 beneath the membrane. The ridges are mounted on a high resistivity photoconductive substrate 21 and a voltage is applied between the membrane 18 and a transparent electrode 22 on the back surface of the substrate by means of a battery 23. When the substrate is illuminated by a pattern of electromagnetic radiation from sources such as $S^1$, $S^2$ and $S^3$, illuminated area of the substrate become conductive and the field across the well (that is, between the membrane and the upper surface of the substrate) becomes sufficient to deflect the membrane. A deflected region of the membrane is illustrated at 24 while undeflected regions are shown at 25. The strength of the field is chosen so that the amount of deflection is precisely equal to one-quarter of the wavelength of the beam arriving from the laser, thus furnishing a 180° or $\pi$ radians phase shift in the beam reflected from an area corresponding to an illuminated source. Thus, in the beam reflected from the membrane, 17, the regions reflected from areas 25 of the membrane which have not been deflected have the same phase as the beam from the regions over ridges 19 while the regions reflected from areas 24 of the membrane which have been deflected are shifted in phase by an angle of $\pi$ radians. By controlling the input pattern applied to the phase modulator array 16, the information contained at selected regions of the coherent beam can be controlled in a binary digital pattern. As disclosed in my aforementioned Patent, other suitable means may also be used for controlling the deflection or nondeflection of various regions of the membrane; for example, direct electrical connection of an appropriate field to an electrode at the bottom of the well through a manual or electrical switch can also be used.

For clarity of description, the remainder of this specification is set forth in terms of such phase modulation and, for convenience, the binary digits "0" and "1" correspond respectively to the undeflected and deflected conditions of an area of the membrane. It follows that the binary digit "0" corresponds to an absence of illumination at the input to the membrane and to a phase equal to that of the reference in the reflected beam while the binary digit "1" corresponds to the presence of illumination at the input to the membrane and to a phase change of $\pi$ radians from the reference in the corresponding area of the reflected beam.

The system of the present invention performs propositional logic by holographically mixing selected regions of the laser beam which have been modulated to contain certain input information. The mixing occurs in accord with the properties of holographic reproduction stated above; the results of such mixing correspond to the results of various propositional logic operators. The processing element 26 which accomplishes this function is a holographic transparency which corresponds to an array of points so that, when it is illuminated by an information-bearing beam, it produces multiple reproductions of the beam. The manner in which processing is performed by this element is set forth below; in general, the output from the element 26 is focused to produce an array of light and dark points which can be used in further processing or converted into electrical signals by means such as photocells. If further processing is to be performed, the output of the element 26 can be determined and used by a second array of modulators 27, identical to the array 16, which modulate the portion of the coherent beam 14 which was provided for Stage II by beam splitter 12 and brought to the second array 27 by mirror 28 and beam splitter 29. The modulated beam is then applied to another processing element 30 and, eventually, to a readout of the result by means such as photocells 31.

To process information, the mask from which the hologram is made and its internal pattern of phase, amplitude and spatial relationships are arranged to produce an output image having a pattern which depends on the input data. In general, this pattern occurs by means of vector addition of radiation from each of the input regions in a selected set at a common location to which the vectors have been focused by the fringes of the holographic transparency. The set is defined by the array of points to which the hologram corresponds, and the phase and amplitude of each resultant vector is controlled by the phase and amplitude of the corresponding point in the array. The phase shift relative to a reference may be zero or some value of advanced or retarded phase determined in accord with the following discussion. The vector addition produces an output by means of interference.

The specific details of this processing method can best be understood by considering the specific examples set forth below. The examples given are the logical operators which would be used in a processing system based on binary digital logic; however, it is not intended to limit this invention to the specific illustrated cases.

As one example, FIGS. 2a, 2b and 2c represent a modulated input beam, a mask used to form the hologram and the resultant output pattern. These have been selected to demonstrate the manner in which the IDENTITY function is performed by this invention.

FIG. 2a illustrates the four possible binary input patterns of information which might be carried at different times by any set of two adjacent input regions. For ease of description, these patterns are displayed as they would be if four vertically adjacent sets happened to have these patterns at a given time. This illustration also demonstrates an additional, and extremely significant, property of holographic processing, namely, the complete distinction maintained between different sets of inputs and the results obtained therefrom.

The pattern of FIG. 2a contains information corresponding to the following table:

00
01
10
11

This information is contained by means of the phase of the beam at the bit locations as compared to the background illumination which is the reference. A "0" is indicated by light of the same phase as the background 32, at the location of the dotted circles 33, while "1" is indicated by light which is 180° out of phase with the background, at the location of the circles 34 marked "$\pi$." FIG. 2b, for purposes of illustration, shows the two element array 35 in the holographic mask 36 rather than the hologram as the hologram itself is an array of fringes which are not meaningful to a human observer. The mask in this case comprises an opaque screen having two apertures arranged so that the light beams passing through them have the same phase. The holographic transparency made from this mask is the processing element 26 of FIG. 1. If this element is provided in the apparatus of FIG. 1, the hologram produces identical images of the input pattern on each side of the optical axis. There are two images because light diffraction in the hologram produces both a real image and its complex conjugate. Either or both of these images may be used for further processing or to yield an output; in the remainder of this specification, it is assumed for convenience that only one image has been selected. In an actual system, both images could be used in different ways. FIG. 2c shows one of these images in an actual system, the image is inverted from that shown. For clarity, this inversion has not been shown in the accompanying figures; in practice its only effect is that the output determining means must be arranged to read the inverted image.

In accord with the previous discussion of holographic reproduction, each source region produces an image of the holographic mask and these images overlap in a pattern such that each set of source regions having the same spatial relation as the holographic mask points overlap at one location in the output plane and, since the light is coherent, they are summed at the point. Thus, in FIGS. 2a, 2b and 2c, if the apertures in the mask and the regions in the source are or appear to be of the same size and spacing in the respective input planes (i.e., the mask in its input plane when the hologram is made and the source in its input plane in the system of FIG. 1) then the pattern of FIG. 2c is produced in the following manner; source region S–1 produces an image of mask points M–1 and M–2 at output points 0–1 and 0–2; S–2 images M–1 and M–2 at 0–2 and 0–3; S–3 images M–1 and M–2 at 0–4 and 0–5; S–4 images M– 1 and M–2 at 0–5 and 0–6; etc. These images overlap so that the set of regions S–1 and S–2 having the same spatial relation as M–1 and M–2 are summed at 0–2; S–3 and S–4 are summed at 0–5; S–5 and S–6 are summed at 0–8 and S–7 and S–8 are summed at 0–11. (Note that no other combinations of the source regions such as S–1 and S–3 or S–1 and S–4 appear since their spatial relation does not correspond to that of the array 35.)

The dash-dot square 37 represents the central region where the two halves overlap. Since the laser beam is coherent, light from the two images interferes in the overlapping region. In the illustration, it can be seen that an output of light is obtained when both input bits are "0" and in phase with each other so that constructive interference has occurred. The inputs 0.1 and 1.0 are out of phase and have destructively interfered to produce the black spots in the middle of the central region. Finally, the input pair 1,1 also produces a light output by means of constructive interference of in-phase light.

By interpreting the presence of light as a "1" and the absence of light as "0" at the output, the following operation has been generated:

| Inputs | | Outputs |
|---|---|---|
| (0,0) ..... | + | 1 |
| (0,1) ..... | + | 0 |
| (1,0) ..... | + | 0 |
| (1,1) ..... | + | 1 |

This operation is equivalent to the following truth table:

| | 0 | 1 |
|---|---|---|
| 0 | 1 | 0 |
| 1 | 0 | 1 |

which is the truth table of the identity function. This shows that the application of any pair of input bits to this hologram produces an output in accord with the identity function and this may be used in the sequence of logical operations of a computer.

It is noted that the convention used to interpret the output from this operation corresponds exactly to that of the input to the photo-MLM which is used as the input phase modulator in the preferred embodiment. Thus, if the array of modulators which serves as the input to the next computer stage is positioned to receive the light produced in the output plane, as in FIG. 1, the absence of output light, interpreted as a "0" leaves the membrane undeflected, the carrier beam of the next stage remains at the same phase as the reference and a "0" is indicated. Similarly, the presence of output light, interpreted as "1," causes deflection of the membrane, the phase of the beam at the spot is shifted $\pi$ radians, and a "1" is carried into the next stage. Accordingly, direct coupling between successive processing stages is provided.

The foregoing illustration also demonstrates another extremely important feature of the system of this invention. In this illustration, four pairs of inputs were applied to a single optical processing element and the result from each pair remained completely distinct. This is because spatial equivalence to the holographic mask is required before overlap can occur. Since this also applies when many more than four sets of inputs are applied to a single hologram, simultaneous processing can be accomplished without a corresponding increase in the number of processing circuits required. In fact, since present lenses can be made with a resolving power of 100 million, 50 million pairs of bits can be simultaneously applied to a single hologram of the mask illustrated in FIG. 2*b* and 50 million distinct results can be obtained. Clearly, a substantial reduction in the size and cost of a system of given capacity can be achieved.

FIGS. 3*a*, 3*b* and 3*c* illustrate another function which is achieved by means of the operator of FIG. 2*b*. This is the NEGATE function; it is obtained by applying any desired single input to the hologram made from FIG. 3*b* and adding it to background illumination (reference) at the region which has the same spatial relation to it as the mask points.

In FIG. 3*a*, two inputs "0" and "1" at regions 38 and 39 are applied to the carrier beam. The effect of the holograms made of the two apertures of FIG. 3*b* is to compare each input in FIG. 3*a* with the background formed by the carrier beam as it exists in the location corresponding to the location of the second mask aperture. It is assumed, in operators which require a reference, that the reflected beam is large enough to provide such a region. Thus the holographic transparency sums a pair of elements as shown in FIG. 3*b* in place of each of the inputs of FIG. 3*a* and produces a double image thereof as shown in FIG. 3*c*. The inversion produced in an actual system has again been neglected. Since the second element 40, 41 of each pair in FIG. 3*b* is the background beam and has a phase angle of zero, the two inputs become input pairs (0.0) and (0.1) In the central region 42 of FIG. 3 *c* where the output images overlap, it is seen that the "0" input 38 of FIG. 3*a* has produced a "1" output (i.e., illumination) due to constructive interference between the in-phase beams from the (0.0) of FIG. 3*b* while the "1" input 39 has produced a "0" output (i.e., a dark spot; due to destructive interference between the out-of-phase beams from (0.7) of FIG. 3*b*. Thus the NEGATE function has been generated. This is also referred to as the "ones complement."

As is the case in electronic data processing, another operator is required in order to perform propositional logic. This may be either the AND, OR, NAND or NOR operator. The OR operator is described below; the remaining operators may be generated by appropriate combinations of the OR and NEGATE operators.

The OR operator functions to provide a "1" output when any one or more of a plurality of inputs are "1" and a "0" output when all of the inputs are "0." In the system of this invention, a hologram to provide this output corresponds to an array of points; the number, arrangement and phases relationships of the points in the holographic mask are selected so that the vector sum of the light present at the output point is zero if the inputs are all "0," and greater than zero if one or more of the inputs are "1." This is accomplished if the apertures in the mask are arranged to sum all of the inputs plus a reference and if the apertures provide a phase change for each input and the reference such that the phase changes add up to $2\pi$. If all of the inputs and the reference applied to this hologram have the same phase (that is, if all the inputs are "0"), then the vectors at the output point will be shifted in phase by amounts which form a balanced set totaling zero; thus, the output is the "-dark" condition, or "0." If one (or more) of the input vectors differ in phase by $\pi$ (a "1" input) then the corresponding output vector is also shifted by $\pi$, the set is unbalanced and a "light" condition or "1" is obtained.

Thus the holographic mask for the OR operator must include a group of apertures corresponding in number and location to the information-bearing inputs plus at least one aperture which corresponds to another location adjacent these inputs and which can only be at the background illumination (reference) level. In accord with this invention, the pattern of phase relationships is defined by the phase shift caused by each array point relative to a reference and, for the OR operator, these phase shifts must be uniquely selected from the set defined by the expression $$2k\pi/m,\ k=1, 2, \ldots, m$$

where $m$ is the number of array points defined by apertures 45. In other words, one aperture must change the phase of light passing through it by $2\pi/m$, one must provide a phase change of $4\pi/m$, one of $6\pi/m$,..., and one must provide a change of $2m\pi/m$ (or, equivalently, zero). The phase change may be either a phase advance or a phase retard; for convenience, the following description is based on the use of phase advance relative to a reference.

One additional factor which must also be considered is the fact that an even number of apertures can produce an ambiguous output. In this case, if two inputs corresponding to opposing sides of the output vector polygon which totals zero when all inputs are "0" should both become "1," the reversal of their output vectors would balance and the vector total would continue to be zero. In order to avoid this, the number of apertures should always be odd so that no two sides of the output vector polygon are exactly the same. Thus, if the number of information-bearing inputs $n$ is even, $n+1$ m,... provided to sum the $n$ inputs and one reference point. If $n$ is odd, $n+2$ apertures are provided to sum the $n$ inputs and two reference points. The extra reference vector does not affect the result in any way. In either case, the number of apertures, $m=n+1$ or $m=n+2$, is odd and the ambiguity is avoided.

An actual mask including such an array and from which the hologram may be made may comprise a sheet 43 of transparent material as illustrated in FIG. 4 which has an everlying layer of opaque material 44. The desired number of apertures 45 are defined in the opaque layer, and portions 46*a*, 46*b* and 46*c* of the transparent layer are removed at appropriate aperture locations so that the successive apertures would change the phase of a light beam passing therethrough by amounts differing in steps of $2\pi/m$. The phases of the output beams from the illustrated mask would be $2\pi/m$, $4\pi/m$,... $2m\pi/m$ where $m=3$. Thus, FIG. 4 shows three apertures which advance the phase by the indicated quantities relative to the phase of light passing through the entire thickness. Equivalently, the third removed portion 46*c* could be left in place. As previously noted, the hologram corresponding to this mask forms the processing element 26 and its effect is to produce output images consisting of overlapped reproductions of the source points which have phases changed from that of the corresponding source point by the phase of the corresponding aperture, in accord with the properties previously discussed.

Figure 5C:
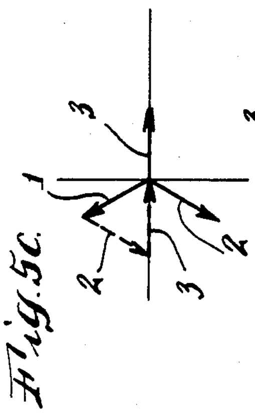
Figure 5D:
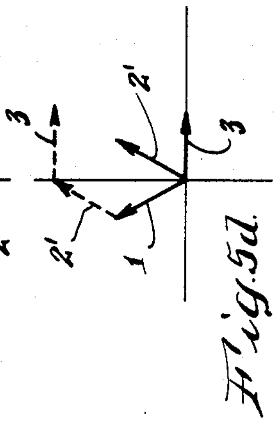
Figure 5E:
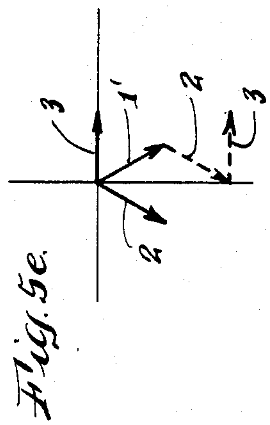
Figure 5F:
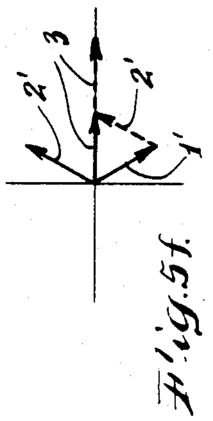
Figure 5B:
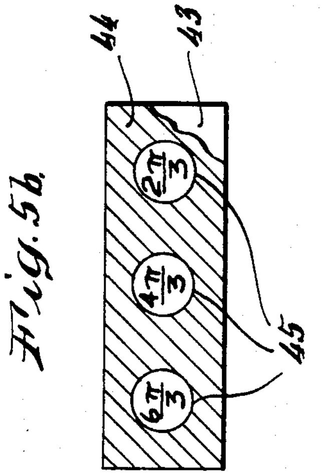
Figure 5G:
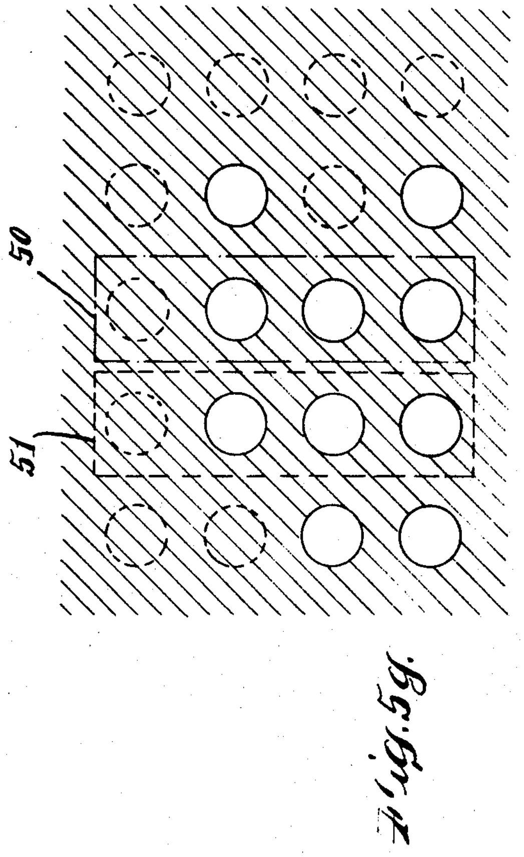
Figure 5A:
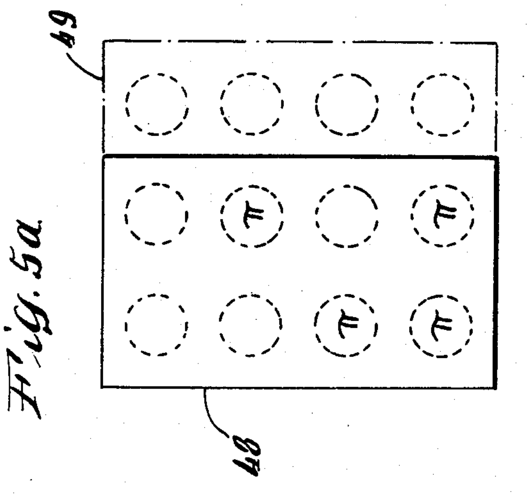

To illustrate the application of this operator in a particular situation, FIGS. 5*a* and 5*b* respectively illustrate the input and the mask for an OR operator used with two information-bearing inputs. The solid-line portion 48 of FIG. 5*a* corresponds to the four possible input pairs, namely, (0,0); (0,1), (1,0) and (1,1). In FIG. 5*b*, the mask including the three apertures 45 to which the hologram corresponds is illustrated and the relative phase modulation produced by each aperture is given by the quantity within the aperture.

As in the case of the negate function previously described, the existence of three apertures in the mask causes the sum to be of three points having the same spatial relation. It is again assumed that the reference inputs to be added by the hologram are produced by providing a sufficient area of light at the reference level, for example in the dashed-line portion 49 to the right in FIG. 5*a*. It is noted that the relative order of the mask phase relationships and of the inputs is not of significance.

FIGS. 5*c*–5*f* illustrate the vector sum produced at the pertinent points in the output plane for the input of FIG. 5*a*. In each diagram, the vectors 1, 2, 3 represented by solid arrows are the three vectors from the three corresponding input regions in FIG. 5*a* as summed, according to the phase relationships of the array, by the hologram. The dotted arrows 2 and 3 are exactly the same vectors as the solid arrows except that they are positioned to illustrate the vector addition. The vectors denoted "1′" and "2′" in FIGS. 5*d*, 5*e* and 5*f* correspond to the modification produced by the "$\pi$" inputs in the pattern of FIG. 5*a*. Vector 3 has no other position since it corresponds to the reference input and is always at "0" phase.

In FIG. 5*c*, the three vectors 1, 2 and 3 are successively advanced in phase by the quantity $2\pi/3$; accordingly, the sum is zero (since all are of equal magnitude) which corresponds to a dark condition. In FIGS. 5*d*, 5*e* and 5*f*, however, the $\pi$ phase shift introduced by the input destroys the balance and a light condition (nonzero resultant) exists. FIG. 5*g* shows the output image (neglecting inversion) produced by the combination of FIGS. 5*a* and 5*b*; the vector sums shown in FIGS. 5*c*–5*f* occur in box 50. (Note that box 51 is identical and could also be used; in this case, the reference point seen by the hologram would be to the left of FIG. 5*a* and the vectors would be renumbered so that vector 1 would correspond to the reference input as modified by the $2\pi/3$ aperture.)

In box 50, the dark output occurs in the top position; the other outputs are light. Thus, the results are: 0, 1, 1, 1 and the truth table for operator made from the mask of FIG. 5*b* is:

| | 0 | 1 |
|---|---|---|
| 0 | 0 | 1 |
| 1 | 1 | 1 |

Since this is the truth table of the OR function, the holographic processing element described is the required OR operator.

As previously noted, all propositional logic may be performed by combining the OR and the NEGATE operators. Thus, by assembling a sufficient number of these holographic elements in their appropriate optical circuits, a digital computer can be constructed. FIGS. 6*a*, 6*b* and 6*c* respectively illustrate a desired logical operation in conventional logic notation, the equivalent operation in terms of the OR and NEGATE operators, and the actual input and output interconnections as they exist in an optical processor in accord with this invention.

For illustrative purposes, the logical operation to be performed is that of producing a "1" output when input information bits Z and either one of X and Y are "1." Accordingly, in FIG. 6*a*, X and Y are applied to an OR gate 52 and any output therefrom is applied, with bit Z, to an AND-gate 53. This arrangement produces the desired output function. FIG. 6*b* shows the functional equivalent wherein bits *X* and *Y* are applied or OR gate 52 and the output from gate 52 is reversed by a NEGATE operator 54. Input bit *Z* is also negated by operator 55. The negatives of (*X* or *Y*) and of *Z* are then applied to a subsequent OR gate 56 which is in turn followed by a NEGATE operator 57. The logical equation performed by this series of operators is as follows:

$$(\overline{\overline{X+Y}=\overline{Z}})=(X+Y)\cdot Z$$

FIG. 6*c* shows a corresponding system in accord with the present invention wherein the inputs *X* and *Y* are applied to appropriate locations in a phase modulating array 58, and the carrier beam reflected from this array is applied to the holographic element 59 which performs the OR operation. The output therefrom and input *Z* are applied to a second array 60 and the carrier beam reflected therefrom is applied to the NEGATE hologram 61. These outputs (namely, $\overline{X+Y}$ and $\overline{Z}$) are then used to modulate the next carrier beam via another phase modulator array 62. This beam is operated on by another OR hologram 63, the output is applied to another carrier via array 64, and the final operation is performed by another NEGATE hologram 65. Accordingly, the output of the system is $[(X+Y)\cdot z\pi$ which is the required function. It is noted that the inputs *X* and *Y*, array 58 and processing element 59 correspond to Stage I of FIG. 1 while array 64, element 65 and the output correspond to Stage II.

It is noted that this example appears complex in that many carrier beams, arrays and circuits are required to process a small number of inputs. In an actual computer, however, these elements would simultaneously process many other inputs with completely distinguishable results; thus, the net effect is a substantial increase in speed and total capability for a given number of elements.

In many cases, the processing steps can be simplified by substituting other operators. As an example, FIGS. *a*–7*e* illustrate the NAND operator; specifically, FIG. 7*a*, shows the input array, FIG. 7*b* shows the holographic mask, FIG. 7*c* shows the resulting output (neglecting inversion) and FIGS. 7*d* and 7*e* show representative vector sums which occur at two output locations. In FIG. 7*a*, the input pattern 66 illustrates all possible combinations of three binary digits. As in FIG. 2*a*, these are shown as occurring simultaneously in eight different sets of input regions; for any one set in an operating system, one of these patterns would exist at any one time and the output obtained by the operator corresponding to the mask of FIG. 7*b* would produce the one output of FIG. 7*c* which corresponds to that pattern.

FIG. 7*a* also shows the reference locations in the dotted line region 67. Two reference points are included in each set because, as previously discussed, the number of output vectors should be odd to avoid ambiguity. The reference region has arbitrarily been placed on the right of pattern 66. Use of a reference region to the left of or divided on each side of the pattern merely shifts the location of the combined vectors in the output plane. As before, information-bearing regions of the beam are indicated by dotted circles and "1" inputs are represented by the use of "$\pi$" to denote the phase shift.

FIG. 7*b* shows the mask 68 which corresponds to the NAND operation for three inputs. The phase relationships identified within the apertures 69 are those which produce a "0" output only when all of the information-bearing inputs are "1." This is accomplished by using the OR operator relationship and adding a phase shift of $\pi$ to as many apertures as there are information-bearing inputs. It does not matter which of the apertures are so modified.

In precise terms, the mask is given an odd number of apertures $m$ which is one or two greater than the number of inputs $n$. Then, for $n$ of these apertures the phase shift is selected from the set defined by:

$$\Delta P=\frac{2k\pi}{m}+\pi,\ k=1,\ 2,\ \cdots,\ m$$

For the remaining one or two apertures $(m-n)$ the phase shifts are selected from the set defined by $$\Delta P=2k\pi/m$$

where $k$ is selected from the values 1, 2,..., $m$ which were not used for the set of $n$ apertures. The phase shift provided may be either a phase advance or a phase retard.

In the illustrated case, $n$ is 3 and $m$ is therefore 5. The phase shift for $n$ of the apertures may be selected as follows:

$$\frac{2\cdot 1\cdot\pi}{5}+\pi,\ \frac{2\cdot 2\cdot\pi}{5}+\pi,\ \text{and}\ \frac{2\cdot 3\cdot\pi}{5}+\pi$$

and the remaining apertures are given a phase shift of:

$$2\cdot 4\cdot\pi/5 \text{ and } 2\cdot 5\cdot\pi/5$$

These phase shifts have been provided so that they advance the phase of the input vectors.

FIG. 7*c* illustrates the output obtained in one segment 70 of the output plane. The vectors from the input regions summed according to the phase relationships defined in FIG. 7*b* produce constructive interference in all cases except the last. Thus, the effect of the operation is as follows:

| Input | NAND | Output |
|---|---|---|
| 000 | + | 1 |
| 001 | + | 1 |
| 010 | + | 1 |
| 011 | + | 1 |
| 100 | + | 1 |
| 101 | + | 1 |
| 110 | + | 1 |
| 111 | + | 0 |

FIGS. 7*d* and 7*e* represent the vector sums which occur for the (0,0,0) and (1,1,1) inputs, respectively. In FIG. 7*d*, vector A corresponds to the first input shifted by $7\pi/5$, B to the second input shifted by $9\pi/5$, etc. The vector sum, R, is nonzero and a light output, which corresponds to a binary "1" is obtained. In FIG. 7*e*, vectors A', B' and C' are similar to A, B and C of FIG. 7*d* except that the $\pi$ modulation of the input regions has reversed their direction. It can be seen that these vectors add to zero and therefore the output location is dark which defines a binary "0." By reversing one or more of the vectors A, B and C according to the patterns of FIG. 7*a*, it will be seen that the remaining outputs are all "1." Thus, the mask shown in FIG. 7*b* defines the processing element required for the NAND operation.

This invention is directed to the method of processing, the preferred apparatus and the specific processing elements for basic binary logic functions which have been set forth. It is noted that the novel method may be performed by other optical apparatus. For example, a suitable system may comprise a coherent source, phase modulating means and a processing element including a plurality of lenses corresponding in number and location to the array of processing points described above. Each of the lenses focuses radiation from one region in each input set on a common focal plane. Spatial distinction of the output locations corresponding to the respective input sets is maintained by the resolution of the lenses, and the requisite phase shift for each region within each set is provided by locating each lens an appropriate distance from the focal plane. Such a system may be used in a manner corresponding to that described above for the holographic processing elements of the preferred embodiment.

It is also noted that other processing than the simple operations illustrated may also be performed with the subject method and apparatus. By appropriate arrangement of the array of points and of their relative phases, many complex systems of processing may be achieved.

Accordingly, while several specific embodiments of this invention have been shown and described, it is intended that the appended claims cover all changes and modifications which fall within the true spirit and scope of this invention.

I claim:

1. A holographic processing element for use in an optical data processing system for reproducing an input beam of coherent light at least three times in a selected pattern of separate output regions and for adjusting the phases of the light arriving at the respective output regions comprising a holographic transparency made up of interference fringes, said fringes corresponding to a hologram made from the interference of a reference beam of coherent light with equal area beams of coherent light from a number of separate points corresponding to the number of times it is desired to reproduce an input beam, said number being an add number of at least three, the phases of the beams from at least three of said points being shifted relative to the reference beam respectively $2k\pi/m$, $k$=1, 2 ... $m$, where $k$ is the number of a point and $m$ is the total number of said points.

2. The holographic processing element of claim 1 for reproducing an input beam three times only, in which beams from said three points have the respective phases $2\pi/3$, $4\pi/3$ and $6\pi/3$.

3. The holographic element of claim 1 for reproducing an input beam more than three times in which in addition to said shift of the phases of beams from a first group of at least three of said points, the phases of the beams from others of said points are shifted relative to the reference beam respectively $2k\ \pi/m+\pi$, $k$=1, 2 ... $m$, where $k$ is selected from those values of 1, 2 ... m not used in the selection of the phase shifts of the first group.